United States Patent
Ramsey et al.

(10) Patent No.: US 11,956,381 B1
(45) Date of Patent: Apr. 9, 2024

(54) PROACTIVE TELEPHONE NUMBER MONITORING BASED ON ANSWER SEIZURE RATIO

(71) Applicant: AVOXI, Atlanta, GA (US)

(72) Inventors: Mitchell Ramsey, Lake Wyile, SC (US); Adam Rawski, Aurora, IL (US); Kalen Kaboth, Madison, WI (US); Richard Welch, Oakwood, GA (US); Lauren Sallarulo, Marietta, GA (US); Randy Layman, Marietta, GA (US)

(73) Assignee: AVOXI, INC., Atlanta, GA (US)

( * ) Notice: Subject to any disclaimer, the term of this patent is extended or adjusted under 35 U.S.C. 154(b) by 0 days.

(21) Appl. No.: 18/155,271

(22) Filed: Jan. 17, 2023

(51) Int. Cl.
  *H04M 3/10* (2006.01)
  *H04M 15/22* (2006.01)
(52) U.S. Cl.
  CPC ............. *H04M 3/10* (2013.01); *H04M 15/22* (2013.01)
(58) Field of Classification Search
  None
  See application file for complete search history.

(56) References Cited

U.S. PATENT DOCUMENTS

| | | | |
|---|---|---|---|
| 5,459,777 A | 10/1995 | Bassa et al. | |
| 5,509,063 A | 4/1996 | Crabtree et al. | |
| 5,550,903 A * | 8/1996 | Chang | H04M 3/36 379/112.06 |
| 5,761,502 A * | 6/1998 | Jacobs | H04L 41/0631 379/221.09 |
| 7,961,857 B2 * | 6/2011 | Zoldi | H04M 15/58 379/120 |
| 8,068,410 B2 | 11/2011 | Zhang | |
| 8,787,541 B1 * | 7/2014 | Saini | H04Q 3/66 379/112.1 |
| 9,614,756 B2 | 4/2017 | Joshi | |
| 2009/0041205 A1 * | 2/2009 | Russell | H04M 3/436 379/35 |
| 2011/0033032 A1 * | 2/2011 | Zhang | H04L 41/5087 379/201.02 |
| 2013/0163730 A1 * | 6/2013 | Majd | H04M 1/24 379/9 |
| 2016/0373575 A1 * | 12/2016 | Presta | H04M 3/367 |
| 2022/0272114 A1 * | 8/2022 | Bharrat | H04L 63/1425 |

FOREIGN PATENT DOCUMENTS

EP  0726018 B1  12/1999

* cited by examiner

*Primary Examiner* — Quoc D Tran
(74) *Attorney, Agent, or Firm* — Carlson, Gaskey & Olds, P.C.

(57) ABSTRACT

A system for monitoring phone numbers includes a computing device having at least one processor and memory associated with the processor. A telephone network supports a plurality of telephone numbers. For each of the phone numbers, the computing device is configured to detect call activity involving the phone number during a detection period having a preselected duration, determine an answer seizure ratio (ASR) for the phone number during the detection period from the call activity, determine a difference between the ASR during the detection period and an ASR from at least one previous detection period for the phone number, and determine whether the difference satisfies at least one preselected criterion. When the criterion is satisfied, the computing device instigates a procedure to investigate or repair the phone number.

20 Claims, 2 Drawing Sheets

PROACTIVE TELEPHONE NUMBER MONITORING BASED ON ANSWER SEIZURE RATIO

BACKGROUND

Telephone numbers are used by individuals and organizations, such as businesses, for a variety of reasons. Whatever the intended use, the customer expects the phone number(s) to work. Of course, situations occur in which a phone number does not work as desired. The customer may recognize a problem and report it to a provider. That typically starts a process that takes considerable time and may present the customer with considerable inconvenience. In some instances, the customer is unable to recognize a problem so it may go unreported and persist for an extended period of time.

Any delay between a time when a phone number begins experiencing a problem and remediation of the problem is undesirable. Any such delays are inconvenient and can prove costly to consumers of telephony services who rely on functional phone numbers to conduct business. Service providers also need to provide reliable service to maintain their customer relationships.

SUMMARY

An illustrative example embodiment of a method of monitoring a plurality of phone numbers includes, for each phone number, automatically detecting call activity involving the phone number during a detection period having a preselected duration, automatically determining an answer seizure ratio (ASR) during the detection period from the call activity, automatically determining a difference between the ASR during the detection period and an ASR from at least one previous detection period, automatically determining that the difference satisfies at least one preselected criterion, and instigating a procedure to investigate or repair the phone number when the difference satisfies the at least one preselected criterion.

In an example embodiment having at least one of the features of the method of the previous paragraph, the at least one previous detection period has a duration that equals the preselected duration.

In an example embodiment having at least one of the features of the method of any of the previous paragraphs, the at least one previous detection period comprises a plurality of previous detection periods each having the duration, each of the plurality of previous detection periods has an associated ASR, and automatically determining the difference between the ASR during the detection period and the ASR from the at least one previous detection period comprises determining the difference between an average ASR of the ASRs of the plurality of previous detection periods and the ASR during the detection period.

In an example embodiment having at least one of the features of the method of any of the previous paragraphs, the preselected duration is one hour and the plurality of previous detections periods are a most recent twenty-four hours prior to the detection period.

In an example embodiment having at least one of the features of the method of any of the previous paragraphs, the detection period occurs during an identified time of one day and the at least one previous detection period occurred during the identified time of at least one other day prior to the one day.

In an example embodiment having at least one of the features of the method of any of the previous paragraphs, the detection period is one hour and the at least one previous detection period is an hour immediately preceding the one hour.

In an example embodiment having at least one of the features of the method of any of the previous paragraphs, the method includes determining a machine-learned model of ASRs for each of a plurality of sets of detection periods and selecting the at least one previous detection period using the machine-learned model.

In an example embodiment having at least one of the features of the method of any of the previous paragraphs, the method includes determining a machine-learned model of ASRs for each of a plurality of sets of detection periods. The at least one preselected criterion is based on the machine-learned model.

In an example embodiment having at least one of the features of the method of any of the previous paragraphs, the at least one preselected criterion is satisfied when the ASR of the detection period is less than approximately 75% of the ASR of the at least one previous detection period.

In an example embodiment having at least one of the features of the method of any of the previous paragraphs, the method includes determining a standard deviation of the ASR of a plurality of previous detection periods and wherein the at least preselected criterion is satisfied when the ASR of the detection period is less than the ASR of the at least one previous detection period by an amount equal to at least one standard deviation.

An illustrative example embodiment of a system for monitoring phone numbers includes a computing device having at least one processor and memory associated with the processor. A telephone network supports a plurality of telephone numbers. For each of the phone numbers, the computing device is configured to detect call activity involving the phone number during a detection period having a preselected duration, determine an answer seizure ratio (ASR) for the phone number during the detection period from the call activity, determine a difference between the ASR during the detection period and an ASR from at least one previous detection period for the phone number. When the difference satisfies at least one preselected criterion, the computing device instigates a procedure to investigate or repair the phone number.

In an example embodiment having at least one of the features of the system of the previous paragraph, the at least one previous detection period has a duration that equals the preselected duration.

In an example embodiment having at least one of the features of the system of any of the previous paragraphs, the at least one previous detection period comprises a plurality of previous detection periods each having the duration, each of the plurality of previous detection periods has an associated ASR, and automatically determining the difference between the ASR during the detection period and the ASR from the at least one previous detection period comprises determining the difference between an average ASR of the ASRs of the plurality of previous detection periods and the ASR during the detection period.

In an example embodiment having at least one of the features of the system of any of the previous paragraphs, the preselected duration is one hour and the plurality of previous detections periods are a most recent twenty-four hours prior to the detection period.

In an example embodiment having at least one of the features of the system of any of the previous paragraphs, the detection period occurs during an identified time of one day and the at least one previous detection period occurred during the identified time of at least one other day prior to the one day.

In an example embodiment having at least one of the features of the system of any of the previous paragraphs, the detection period is one hour and the at least one previous detection period is an hour immediately preceding the one hour.

In an example embodiment having at least one of the features of the system of any of the previous paragraphs, the computing device is configured to determine a machine-learned model of ASRs for each of a plurality of sets of detection periods and select the at least one previous detection period using the machine-learned model.

In an example embodiment having at least one of the features of the system of any of the previous paragraphs, the computing device is configured to determine a machine-learned model of ASRs for each of a plurality of sets of detection periods and determine the at least one preselected criterion using the machine-learned model.

In an example embodiment having at least one of the features of the system of any of the previous paragraphs, the computing device is configured to determine that the at least one preselected criterion is satisfied when the ASR of the detection period is less than approximately 75% of the ASR of the at least one previous detection period.

In an example embodiment having at least one of the features of the system of any of the previous paragraphs, the computing device is configured to determine a standard deviation of the ASR of a plurality of previous detection periods and determine that the at least preselected criterion is satisfied when the ASR of the detection period is less than the ASR of the at least one previous detection period by an amount equal to at least one standard deviation.

The various features and advantages of an example embodiment will become apparent to those skilled in the art from the following detailed description. The drawings that accompany the detailed description can be briefly described as follows.

DETAILED DESCRIPTION

Embodiments of this invention provide automated phone number monitoring based on an answer seizure ratio (ASR) during a detection period, which is the number of answered calls to a phone number divided by the total number of calls to that phone number. Automatically monitoring the ASR facilitates proactively detecting problems or potential problems with a phone number even before a customer may notice such a problem.

Figure 1:
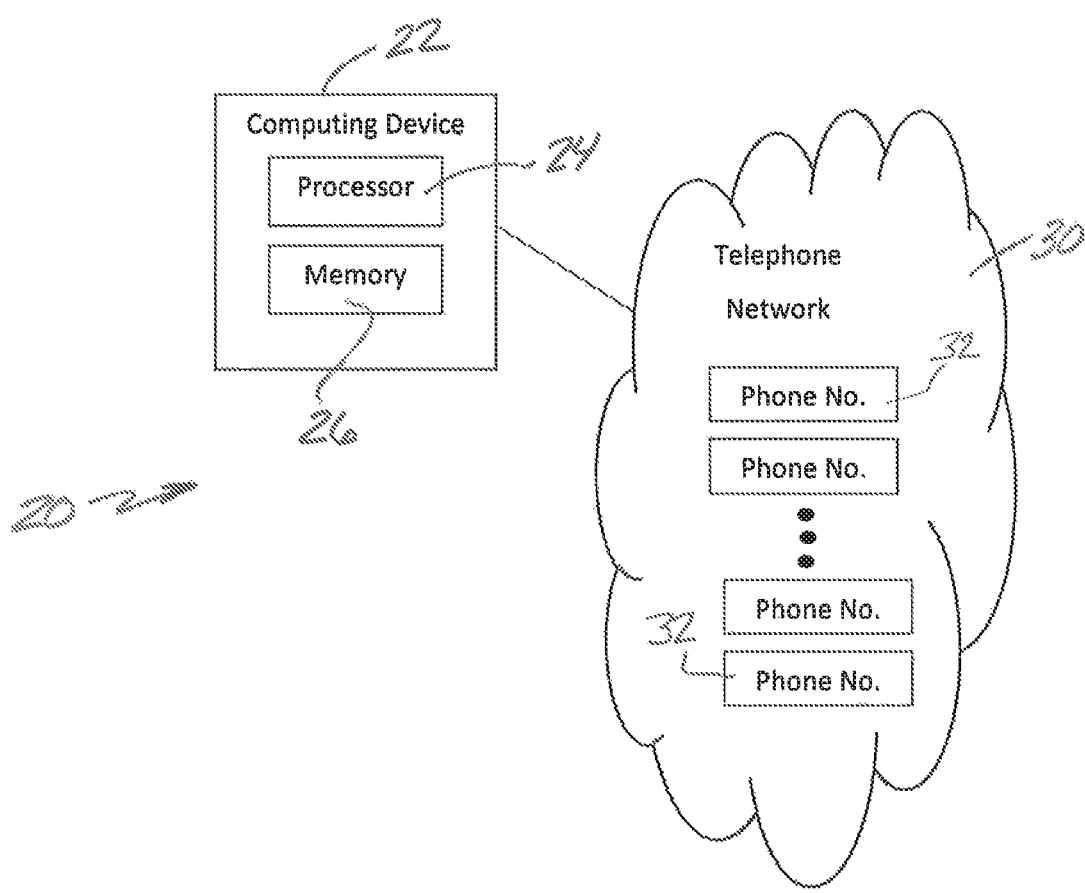
FIG. 1 schematically illustrates selected portions of an example embodiment of a system for automatically monitoring phone numbers.

An example embodiment of a system 20 that is configured to monitor phone numbers is schematically shown in FIG. 1. A computing device 22, which is particularly configured or programmed to be part of a telephony platform, includes at least one processor 24 and memory 26 associated with the processor 24. The computing device 22 is schematically illustrated as a single device for discussion purposes. Some embodiments include multiple devices, such as a plurality of processors that are part of a cloud computing network.

The computing device 22 is linked to or otherwise has access to a telephone network 30 that includes known equipment to facilitate calls in a known manner. The telephone network 30 supports a plurality of phone numbers 32.

The computing device 22 monitors each of the phone numbers 32 to determine whether any of the phone numbers 32 is malfunctioning. The computing device 22 obtains data directly from the telephone network 30 and uses that data to determine the call activity for each of the phone numbers 32. The call activity corresponds to information or data that may be included in call detail records, such as the calling number, the called number, whether the call was answered, and call duration. In some embodiments, the computing device 22 is configured or programmed to determine the call activity by operating like at least one of a session border controller or a session initiation protocol (SIP) application server.

The data obtained by the computing device 22 corresponds to actual call activity for each phone number 32 during a detection period having a preselected duration. The computing device 22 determines the ASR for each phone number during the detection period and uses information regarding the ASR from at least one previous detection period to determine whether the phone number 32 may be malfunctioning in a way that requires repair.

Figure 2:
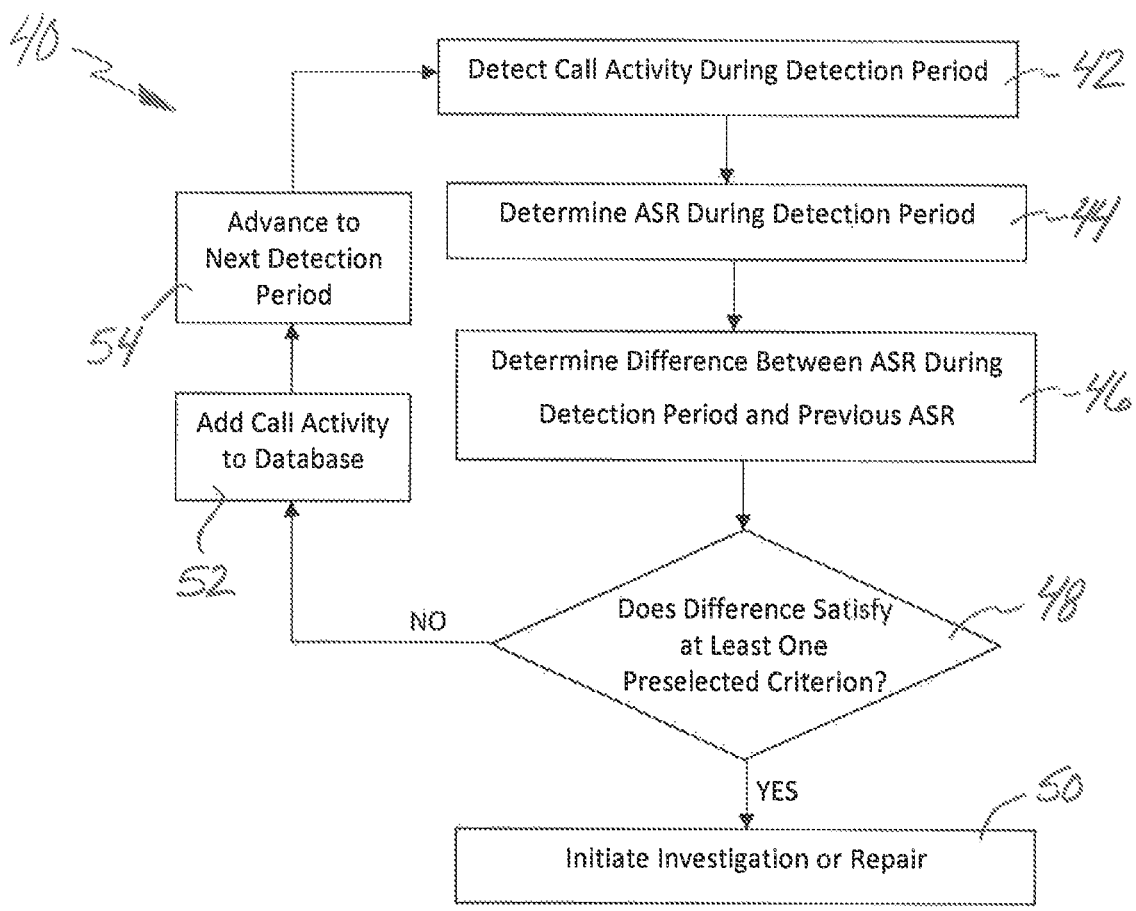
FIG. 2 is a flowchart diagram summarizing an example method of monitoring telephone numbers.

FIG. 2 is a flowchart diagram 40 summarizing an example method implemented by the computing device 22 for monitoring each of the phone numbers 32. At 42, the computing device 22 detects call activity involving the phone number 32 during a detection period having a preselected duration. In this example embodiment, the detection period lasts for one hour. Other detection period durations are useful in some embodiments.

The call activity will typically include a number of calls placed to the phone number, a number of calls to the phone number that were answered, a duration of each answered call, and other information. The computing device 22 uses the information regarding the number of placed calls and the number of answered calls to determine the ASR during the detection period at 44.

At 46, the computing device 22 determines a difference between the ASR of the detection period and an ASR of at least one previous detection period. In some embodiments, the previous ASR is from an immediately preceding detection period. For example, when the detection period is from 12 o'clock to 1 o'clock, the previous ASR is from 11 o'clock to 12 o'clock.

In some embodiments, the previous ASR used at 46 is based on when the detection period occurs. For example, when the detection period is during the afternoon on one day, the previous ASR is selected from the same time during the afternoon on a previous day, which may be an immediately preceding day or another previous day, such as the same day of the week or a most recent day that is considered relevant. This approach avoids differences that are expected to occur depending on the day, such as the difference in expected call activity on a weekend compared to a week day, from impacting the determinations made by the computing device 22.

In some embodiments, the previous ASR used for determining the difference at 46 is based on a plurality of previous detection periods. For example, when the detection period duration is one hour, the computing device 22 determines an average ASR of a selected set of preceding one-hour detection periods. One example set includes the immediately preceding 24 hours. Another example set includes the hour during the same time of day over a span of several days or weeks. The computing device 22 determines the difference between the average ASR of the set and the ASR of the detection period at 46.

The computing device determines, at 48, whether the difference determined at 46 satisfies at least one preselected criterion. When the criterion is satisfied, that indicates a problem or potential problem with the phone number 32.

In some embodiments, the criterion is a threshold difference. For example, the criterion is satisfied when the ASR of the detection period determined at 44 is less than the previous ASR by an amount that exceeds the threshold. The threshold in some embodiments is based on a percentage of the previous ASR. For example, when the ASR determined at 44 is less than 75% of the previous ASR, the criterion is satisfied. In other words, when the ASR of the detection period is less than the previous ASR and the difference determined at 46 is more than 25% of the previous ASR, the criterion is satisfied.

Another example threshold is based on a standard deviation of the ASR. The computing device 22 in such an embodiment determines a standard deviation of the ASR over time using the ASRs from a selected set of previous detection periods. The criterion used at 48 equals one standard deviation in some embodiments such that when the ASR of the detection period determined at 44 is less than the previous ASR by at least one standard deviation indicates a problem or potential problem.

When the determination at 48 is positive, the computing device 22 instigates an investigation or repair procedure at 50. In some embodiments, the computing device 22 generates a report, an alert, or communicates with another portion of the telephone network 30 to initiate the investigation or repair.

When the ASR does not deviate from the previous ASR sufficiently to satisfy the criterion, the phone number is working as expected. The computing device 22 updates the database of call activity and ASR information to include such information from the detection period at 52. A next detection period begins at 54 and the computing device 22 again performs the method steps indicated at 42-48.

In some example embodiments, the computing device 22 is configured to use machine learning when selecting a previous detection period for purposes of determining a difference between the ASRs of the detection period and a previous detection period. The computing device uses machine learning to recognize a pattern of ASRs over time and uses that pattern to select at least one previous detection period that provides a useful ASR comparison. For example, when a phone number regularly receives a large call volume during certain times and a low call volume during other times, the machine learning model indicates which times are expected to have low or high call volumes. The computing device 22 determines where a detection period currently being considered fits with the machine learning model. If the detection period fits with the times during which the phone number regularly receives large call volumes, then an ASR from such times is used for determining the difference that may indicate a problem with the phone number.

Other example embodiments include machine learning for determining the criterion used to determine whether the difference in ASRs indicates a problem with the phone number. For example, the machine learning model indicates a pattern that the ASR for a phone number follows over time. If the model indicates that the ASR typically drops at a certain time of day, a threshold difference used by the computing device to determine whether there is a problem with the phone number can be increased to accommodate the expected increase in that difference at that time of day.

Given this description and known machine learning techniques, those skilled in the art will realize how such models can be used to determine useful, recognizable patterns in call activity for phone numbers to meet the needs of their particular situation.

The example disclosed system and method provide automated phone number monitoring based on ASR that is fully automated and improves the economies associated with identifying and remedying problems with individual phone numbers.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of monitoring a plurality of phone numbers, the method comprising, for each phone number:
   automatically detecting call activity involving the phone number during a detection period having a preselected duration;
   automatically determining an answer seizure ratio (ASR) during the detection period from the call activity;
   automatically determining a difference between the ASR during the detection period and an ASR for the phone number from at least one previous detection period; and
   automatically determining that the difference satisfies at least one preselected criterion and instigating a procedure to investigate or repair the phone number when the difference satisfies the at least one preselected criterion.

2. The method of claim 1, wherein the at least one previous detection period has a duration that equals the preselected duration.

3. The method of claim 2, wherein
   the at least one previous detection period comprises a plurality of previous detection periods each having the duration,
   each of the plurality of previous detection periods has an associated ASR, and
   automatically determining the difference between the ASR during the detection period and the ASR from the at least one previous detection period comprises determining the difference between an average ASR of the ASRs of the plurality of previous detection periods and the ASR during the detection period.

4. The method of claim 3, wherein
   the preselected duration is one hour, and
   the plurality of previous detections periods are a most recent twenty-four hours prior to the detection period.

5. The method of claim 1, wherein
   the detection period occurs during an identified time of one day, and
   the at least one previous detection period occurred during the identified time of at least one other day prior to the one day.

6. The method of claim 1, wherein
   the detection period is one hour, and
   the at least one previous detection period is an hour immediately preceding the one hour.

7. The method of claim 1, comprising
   determining a machine-learned model of ASRs for each of a plurality of sets of detection periods, and selecting the at least one previous detection period using the machine-learned model.

8. The method of claim 1, comprising determining a machine-learned model of ASRs for each of a plurality of sets of detection periods, and
wherein the at least one preselected criterion is based on the machine-learned model.

9. The method of claim 1, wherein the at least one preselected criterion is satisfied when the ASR of the detection period is less than approximately 75% of the ASR of the at least one previous detection period.

10. The method of claim 1, comprising determining a standard deviation of the ASR of a plurality of previous detection periods and wherein the at least preselected criterion is satisfied when the ASR of the detection period is less than the ASR of the at least one previous detection period by an amount equal to at least one standard deviation.

11. A system for monitoring a plurality of phone numbers, the system comprising:
a computing device including at least one processor and memory associated with the at least one processor; and
a telephone network including a plurality of telephone numbers,
wherein, for each phone number, the computing device is configured to:
detect call activity involving the phone number during a detection period having a preselected duration;
determine an answer seizure ratio (ASR) for the phone number during the detection period from the call activity;
determine a difference between the ASR for the phone number during the detection period and an ASR for the phone number from at least one previous detection period; and
determine that the difference satisfies at least one preselected criterion and instigate a procedure to investigate or repair the phone number when the difference satisfies the at least one preselected criterion.

12. The system of claim 11, wherein the at least one previous detection period has a duration that equals the preselected duration.

13. The system of claim 12, wherein
the at least one previous detection period comprises a plurality of previous detection periods each having the duration,
each of the plurality of previous detection periods has an associated ASR, and
automatically determining the difference between the ASR during the detection period and the ASR from the at least one previous detection period comprises determining the difference between an average ASR of the ASRs of the plurality of previous detection periods and the ASR during the detection period.

14. The system of claim 13, wherein
the preselected duration is one hour, and
the plurality of previous detections periods are a most recent twenty-four hours prior to the detection period.

15. The system of claim 11, wherein
the detection period occurs during an identified time of one day, and
the at least one previous detection period occurred during the identified time of at least one other day prior to the one day.

16. The system of claim 11, wherein
the detection period is one hour, and
the at least one previous detection period is an hour immediately preceding the one hour.

17. The system of claim 11, wherein the computing device is configured to
determine a machine-learned model of ASRs for each of a plurality of sets of detection periods, and
select the at least one previous detection period using the machine-learned model.

18. The system of claim 11, wherein the computing device is configured to
determine a machine-learned model of ASRs for each of a plurality of sets of detection periods, and
determine the at least one preselected criterion using the machine-learned model.

19. The system of claim 11, wherein the computing device is configured to determine that the at least one preselected criterion is satisfied when the ASR of the detection period is less than approximately 75% of the ASR of the at least one previous detection period.

20. The system of claim 11, wherein the computing device is configured to
determine a standard deviation of the ASR of a plurality of previous detection periods, and
determine that the at least preselected criterion is satisfied when the ASR of the detection period is less than the ASR of the at least one previous detection period by an amount equal to at least one standard deviation.

* * * * *